Figure 5:
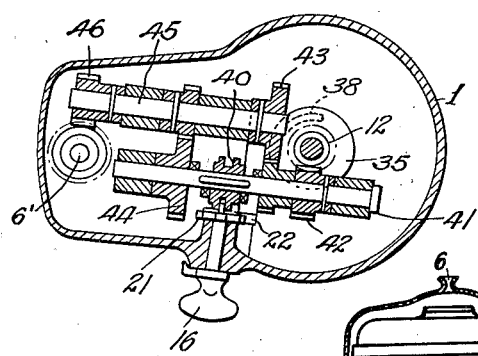

July 26, 1938.     J. LIPS     2,125,118

MOTOR DRIVEN CULINARY MACHINE

Filed July 28, 1937     2 Sheets-Sheet 1

INVENTOR
JAKOB LIPS
BY Richards & Geier
ATTORNEYS

July 26, 1938.                J. LIPS                2,125,118
              MOTOR DRIVEN CULINARY MACHINE
              Filed July 28, 1937        2 Sheets-Sheet 2
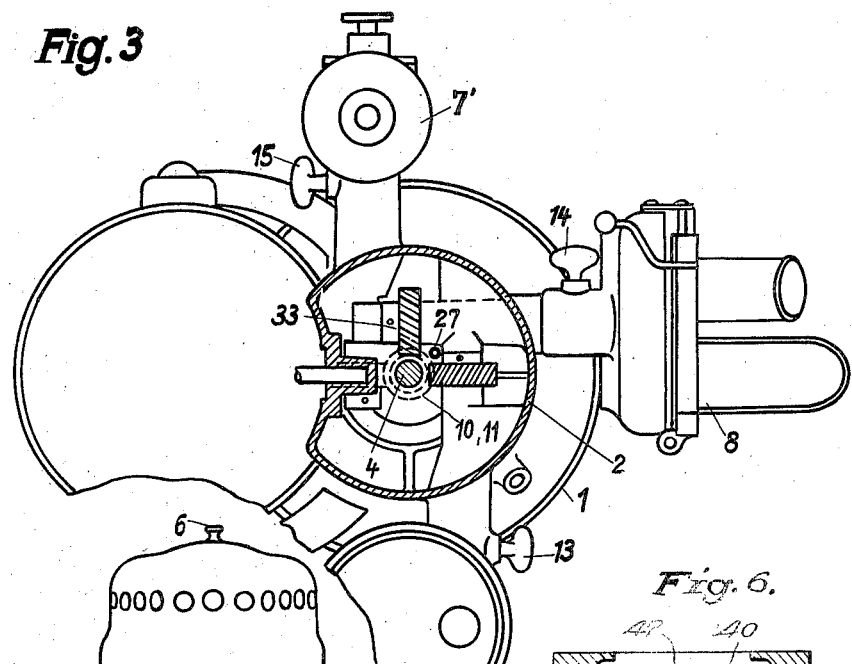
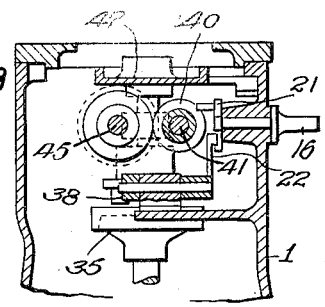
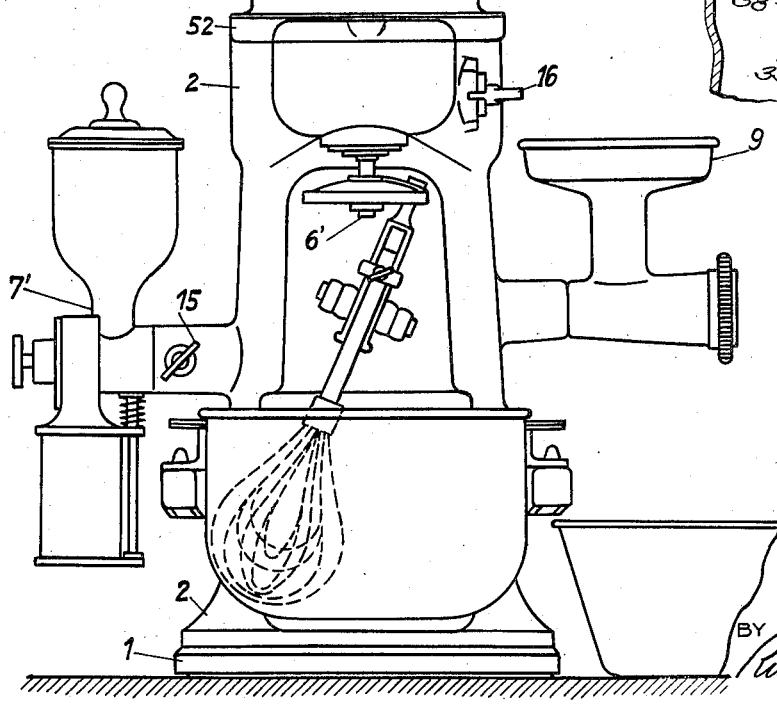
INVENTOR
JAKOB LIPS
BY Richards & Geier
ATTORNEYS Patented July 26, 1938

2,125,118

UNITED STATES PATENT OFFICE 2,125,118

MOTOR DRIVEN CULINARY MACHINE

Jakob Lips, Urdorf, Switzerland

Application July 28, 1937, Serial No. 156,073
In Switzerland July 23, 1936

1 Claim. (Cl. 192—3.5)

This invention relates to a motor driven culinary machine, which is more especially adapted to be used as a table machine, that is to say not as a machine which stands on the floor, but a machine which can be placed on a kitchen table.

These table machines operate under entirely different conditions to those mostly usual in large concerns consisting of a large aggregate standing on the floor. In contrast a much larger universality and efficiency is required of table machines as in general they are constructed for smaller concerns. Further, there is also a very substantial difference between the conditions to be fulfilled by a table machine and the conditions to be fulfilled by a machine standing on the floor, namely the entirely different location of the handles and operating devices.

According to the present invention these conditions are borne in mind by making provision for the connection of the operating devices in different positions of height so that the device used at any time is at a convenient level and easy of access for operation. For this purpose a driving shaft, which is preferably vertical, is so arranged in a casing, in the form of a stand, that it is possible for a number of horizontal driving shafts to extend therefrom at different heights, the uppermost one driving a driving shaft located parallel or substantially parallel to the main shaft and which is used as a stirring device. As the stirring device must operate at different speeds a change speed gear must be arranged in advance thereof. In addition by making the stand-like casing rotatable provision is made for turning the stirring device or the other operating devices towards the front or towards the back, as may be desired without interfering with the drive, so that the person manipulating the machine may for example operate the friction device whilst the stirring device continues operation automatically without interfering with the actuation of the friction device.

It is extremely important for the gearing to be easily accessible and yet closed completely to the outside, as in the case of culinary machines it is absolutely essential to prevent the outward passage of a lubricant as this would pollute the foodstuff. For this purpose the upper gearing, according to the invention, is located in a separate gear frame mounted in the casing for separate removal. The casing can therefore be constructed in one part up to the top and at the top is closed by a cover. The drive of the upper driving device can be disengaged in order to enable a change of speed to be effected in connection with the branched-off drive. The connection to the main shaft is effected by a rotatably mounted worm which is connected to the main shaft by a friction clutch which is capable of being disengaged. During speed changing the worm is disengaged so that then the upper branched driving shaft runs idly.

The superposed gears, operating at high speeds of rotation, require careful lubrication. This is effected in the simplest manner by means of a separate oil supply which continuously conducts the oil collecting in the lower part of the stand-like casing to the top thereof.

In order to prevent damaging the cable which conducts the current to the electric motor driving the machine, provision is made that the stand-like casing cannot be turned through more than about 360°. A stop in the foot prevents further rotation so that the casing with the driving devices must then be turned in the opposite direction. This angle of rotation is entirely sufficient for bringing any operating device in front of the position occupied by the person operating the machine. It is thus not possible to twist or detach the cable.

Figure 4:
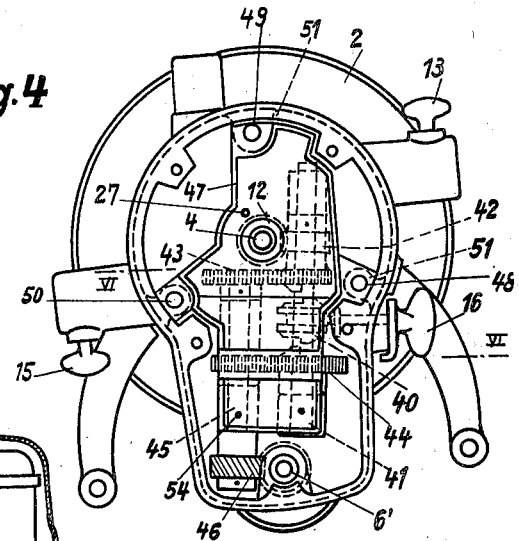
Figure 1:
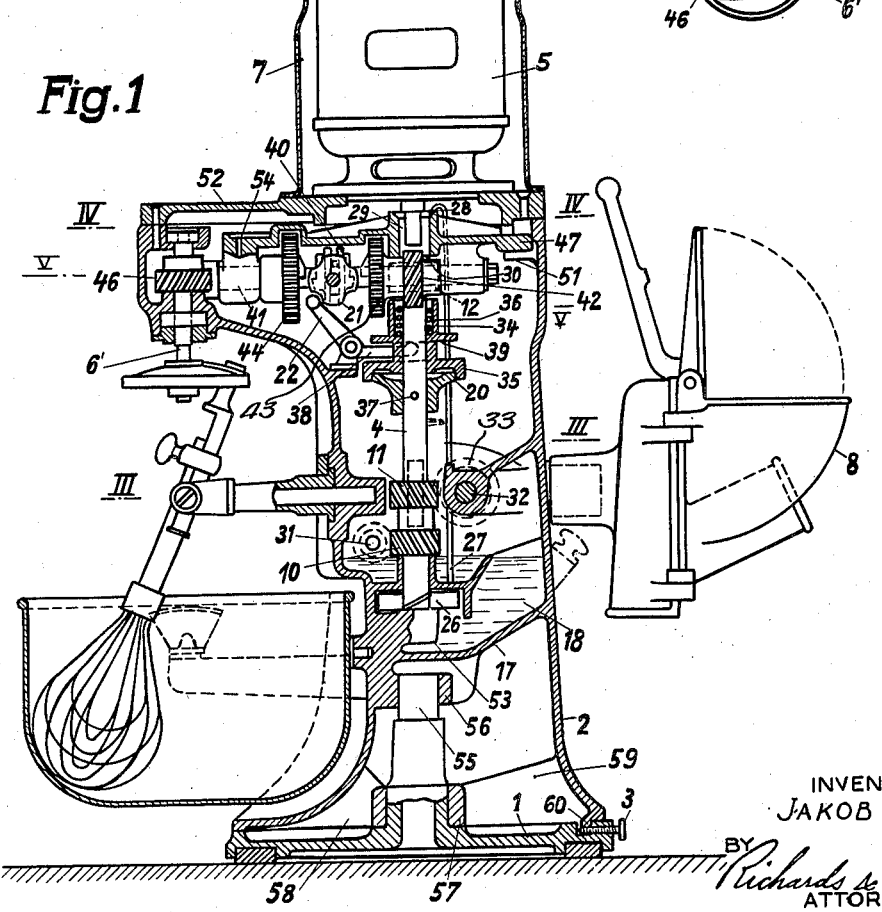

A form of construction of a machine according to the invention is shown diagrammatically by way of example in the accompanying drawings, wherein Fig. 1 shows a vertical section of the machine,
Fig. 2 shows a front elevation, whilst
Figs. 3 and 4 show sections on the lines III—III and IV—IV of Fig. 1.
Fig. 5 is a section along the line V—V of Fig. 1; and
Fig. 6 is a section along the line VI—VI of Fig. 4.

On a base plate 1 there is rotatably mounted the stand-like casing 2. By means of a set screw 3 it can be secured in any set operating position in the known manner, for example by means of an annular stop provided on the casing but not shown in the drawings. In the casing 2 there is mounted the vertical main shaft 4 which passes through the cover plate of the casing at 30 and is connected to the shaft of an electric motor 5. The supply of current takes place through the top through an opening 6 in the motor casing 7. The opening 6 is located in alignment with the motor shaft. The shaft 4 drives through the medium of worm wheel gearing 10, 11 the lower shafts 31, 32, located at different levels, which lead to devices 7' and 9, whilst a further subsidiary gear 33 leads to the operating device 8 (Fig. 3).

Between each member 31, 32 and 33 and the corresponding operating device there is located a clutch of known type, not shown, which can be engaged and disengaged in the known manner by clutch controlling means 13, 14 and 15 (Figs. 2, 3 and 4).

Above the gears leading to the lower driving shaft there is provided the gear for the stirring mechanism. This is effected by means of a worm 12 (Fig. 4) rotatably mounted on the shaft 4. In the section drawing the worm is hidden by the driving shaft located in front thereof. The worm 12 is connected for rotation to the bush 34. The bush 34 may be moved axially in the known manner within the worm or worm wheel 12. The bush 34 is provided at the lower end with the clutch disc 35. A spring 36 presses the clutch disc 35 against the clutch disc 20 keyed to the shaft 4, for example by a pin 37. For disengaging the friction clutch there is provided a bell crank lever 22. The fork 38 of the bell crank lever engages with the bush 34 below the disc flange 39 and spreads the clutch disc 35 and the counter-disc 20 apart against the action of the spring 34 when the free arm 22 of the bell crank lever is rocked in an anti-clockwise direction (Fig. 1).

The lever 22 is rocked automatically during the rotation of the cam disc 21 by means of the knob 16 (Figs. 2 and 4). By means of this knob the clutch sleeve 40 on the branch shaft 41, driven from the worm or worm wheel 12 through the worm or worm wheel 42, is moved simultaneously to the left or to the right and thus couples the drive of the intermediate gear 43 and 44 for slow or fast movement of the intermediate shaft 45 of the stirring mechanism. The intermediate shaft 45 drives the vertical stirring mechanism shaft 6' through worm wheel gearing 46.

By the operation of the cam disc 21 the friction clutch 20, 30, 35 is automatically disengaged each time there is a change of speed so that the worm or worm wheel 14 then rotates freely on the shaft 4. It will be understood that when the knob 16 is not turned through a complete revolution there may also be obtained a position in which a cam of the cam disc 21 has turned the lever 22 to the left so that the stirring mechanism shaft is completely disengaged.

The entire upper gearing is mounted in a separate frame 47 through which there also passes the main shaft 4 (Fig 4). The frame is secured by three bolts 48, 49 and 50 to brackets (Fig. 1). The casing 2 is closed at the top by a cover 52 on which the motor 5 is mounted.

For lubricating the gearings there is provided in the casing 2 an oil bath 18. The casing is closed at the lower part by a partition 17 and above this partition and above the lower bearing 53 of the shaft 4, is located a delivery pump 26 in the form of a blade wheel which conveys oil from the oil bath 18 through the pipe 27 to the upper oil collector 28 for the bearings 29 of the main shaft, from which the oil is distributed to the gearings within the casing without any liability of oil escaping to the outside as the casing completely encloses all the gearings. In addition oil cups are provided above the bearings of the gearings, in which cups oil collects and subsequently flows to the points to be lubricated. A lubrication point is indicated for example at 54 in Fig. 1.

The casing is rotated about the pivot 55 on the base 1. The casing is guided on this pivot by the inwardly extending bearing 56 and the ring 57 which is connected by ribs 58 and 59 to the outer wall of the casing. A stop 60 in the base 2 of the machine simultaneously serves for limiting the rotation thereof, thus preventing the casing from being rotated a number of times and thus damaging the cable which enters at 6.

What I wish to claim is:

In a culinary machine having a rotary casing, a vertical main driving shaft journalled in said casing, and an electric motor on top of said casing connected to said main driving shaft; the combination of a stirring shaft with a clutch disc rotatable along with said main driving shaft, a bush having another clutch disc; a spring engaging said bush and pressing the second-mentioned clutch disc against the first-mentioned clutch disc, a worm rotatable along with said bush, a bell crank lever having a fork and a free arm; said fork engaging said bush and being adapted to move the second-mentioned clutch disc away from the first-mentioned clutch disc when said free arm is turned in a predetermined direction, a cam disc engaging said free arm and adapted to turn the same against the action of said spring, a knob connected with said cam disc, a horizontal branch shaft, a clutch sleeve movable upon said branch shaft, a groove being formed in said clutch sleeve, a pin on said cam disc engaging said groove for moving said clutch sleeve upon said branch shaft, a gear connected with said branch shaft and meshing with said worm on said vertical main driving shaft, and a speed changing gear connecting said stirring shaft with said branch shaft.

JAKOB LIPS.